US008269501B2

(12) United States Patent
Schmidt et al.

(10) Patent No.: US 8,269,501 B2
(45) Date of Patent: Sep. 18, 2012

(54) METHODS FOR MAGNETIC IMAGING OF GEOLOGICAL STRUCTURES (75) Inventors: Howard K. Schmidt, Cypress, TX (US); James M. Tour, Bellaire, TX (US)

(73) Assignee: William Marsh Rice University, Houston, TX (US)

( * ) Notice: Subject to any disclaimer, the term of this patent is extended or adjusted under 35 U.S.C. 154(b) by 817 days.

(21) Appl. No.: 12/350,914

(22) Filed: Jan. 8, 2009

(65) Prior Publication Data
US 2009/0179649 A1 Jul. 16, 2009

Related U.S. Application Data (60) Provisional application No. 61/019,765, filed on Jan. 8, 2008, provisional application No. 61/054,362, filed on May 19, 2008.

(51) Int. Cl.
G01V 3/00 (2006.01)
G01V 3/08 (2006.01)
(52) U.S. Cl. ........ 324/345; 324/324; 324/338; 324/339; 324/351; 324/346; 324/303; 324/356; 702/6; 702/9; 702/11; 702/12; 702/13; 166/254.2
(58) Field of Classification Search .................. 324/345, 324/351, 346, 303, 356, 324, 338, 339; 702/6.9, 702/11, 12, 13, 69; 166/254.2
See application file for complete search history.

(56) References Cited

U.S. PATENT DOCUMENTS

| | | | | |
|---|---|---|---|---|
| 2,364,957 A | * | 12/1944 | Norvel | 324/356 |
| 3,044,548 A | * | 7/1962 | Perry et al. | 166/254.2 |
| 3,412,815 A | * | 11/1968 | Jones et al. | 175/41 |
| 3,973,181 A | * | 8/1976 | Calvert | 324/355 |
| 4,035,718 A | * | 7/1977 | Chandler | 324/303 |
| 4,166,500 A | * | 9/1979 | McPhee | 166/254.2 |
| 4,349,781 A | * | 9/1982 | Vozoff | 324/346 |
| 4,491,796 A | * | 1/1985 | Smith | 324/346 |
| 4,703,427 A | * | 10/1987 | Catala et al. | 702/12 |
| 4,817,062 A | * | 3/1989 | De Buyl et al. | 367/73 |

(Continued)

FOREIGN PATENT DOCUMENTS

JP 2007 084407 4/2007

(Continued)

OTHER PUBLICATIONS

International Search Report and Written Opinion for PCT/US2009/030526 mailed Jun. 30, 2009.

(Continued)

Primary Examiner — Patrick Assouad
Assistant Examiner — Lamarr Brown
(74) Attorney, Agent, or Firm — Winstead PC (57) ABSTRACT Methods for imaging geological structures include injecting magnetic materials into the geological structures, placing at least one magnetic probe in a proximity to the geological structures, generating a magnetic field in the geological structures and detecting a magnetic signal. The at least one magnetic probe may be on the surface of the geological structures or reside within the geological structures. The methods also include injecting magnetic materials into the geological structures, placing at least one magnetic detector in the geological structures and measuring a resonant frequency in the at least one magnetic detector. Methods for using magnetic materials in dipole-dipole, dipole-loop and loop-loop transmitter-receiver configurations for geological structure electromagnetic imaging techniques are also disclosed.

25 Claims, 5 Drawing Sheets

U.S. PATENT DOCUMENTS

| | | | |
|---|---|---|---|
| 5,151,658 A * | 9/1992 | Muramatsu et al. | 324/346 |
| 5,543,714 A * | 8/1996 | Blanpain et al. | 324/345 |
| 5,682,099 A * | 10/1997 | Thompson et al. | 324/338 |
| 6,250,848 B1 | 6/2001 | Moridis | |
| 6,435,286 B1 * | 8/2002 | Stump et al. | 175/26 |
| 6,489,772 B1 * | 12/2002 | Holladay et al. | 324/339 |
| 6,512,371 B2 * | 1/2003 | Prammer | 324/303 |
| 6,518,754 B1 * | 2/2003 | Edwards | 324/303 |
| 6,525,540 B1 * | 2/2003 | Kong et al. | 324/338 |
| 6,583,621 B2 * | 6/2003 | Prammer et al. | 324/303 |
| 6,586,931 B2 * | 7/2003 | Taicher | 324/303 |
| 6,600,319 B2 * | 7/2003 | Golan | 324/318 |
| 6,603,309 B2 * | 8/2003 | Forgang et al. | 324/303 |
| 6,923,273 B2 * | 8/2005 | Terry et al. | 175/45 |
| 6,927,578 B2 * | 8/2005 | Homan et al. | 324/342 |
| 6,944,546 B2 * | 9/2005 | Xiao et al. | 702/6 |
| 6,977,505 B1 * | 12/2005 | Rosenquist | 324/345 |
| 7,053,622 B2 * | 5/2006 | Sorensen | 324/346 |
| 7,834,622 B2 * | 11/2010 | Reiderman et al. | 324/303 |
| 7,844,405 B2 * | 11/2010 | Africk | 702/54 |
| 7,898,494 B2 * | 3/2011 | Brune et al. | 343/866 |
| 7,994,786 B2 * | 8/2011 | Weaver et al. | 324/318 |
| 2002/0000808 A1 * | 1/2002 | Nichols | 324/339 |
| 2003/0038634 A1 * | 2/2003 | Strack | 324/323 |
| 2003/0075360 A1 * | 4/2003 | Patel et al. | 175/50 |
| 2003/0129763 A1 * | 7/2003 | Chamberlain et al. | 436/149 |
| 2003/0169032 A1 * | 9/2003 | Minchole et al. | 324/204 |
| 2003/0187582 A1 * | 10/2003 | Goldman et al. | 702/9 |
| 2004/0098202 A1 * | 5/2004 | McNeil et al. | 702/12 |
| 2004/0182606 A1 * | 9/2004 | Goldman et al. | 175/39 |
| 2005/0043892 A1 * | 2/2005 | Lichman et al. | 324/303 |
| 2005/0127916 A1 * | 6/2005 | Tondra | 324/324 |
| 2005/0156592 A1 * | 7/2005 | Bordon et al. | 324/303 |
| 2005/0189945 A1 * | 9/2005 | Reiderman | 324/333 |
| 2005/0216196 A1 * | 9/2005 | Akkurt et al. | 702/6 |
| 2005/0251342 A1 * | 11/2005 | Market et al. | 702/6 |
| 2005/0261835 A1 * | 11/2005 | Wang | 702/6 |
| 2006/0103389 A1 * | 5/2006 | Bespalov et al. | 324/338 |
| 2006/0155474 A1 * | 7/2006 | Venkataramanan et al. | 702/13 |
| 2006/0235618 A1 * | 10/2006 | Wu et al. | 702/6 |
| 2006/0293857 A1 * | 12/2006 | Moos et al. | 702/12 |
| 2007/0061083 A1 * | 3/2007 | Habashy et al. | 702/11 |
| 2007/0075706 A1 * | 4/2007 | Chen et al. | 324/303 |
| 2007/0138459 A1 * | 6/2007 | Wong et al. | 257/9 |
| 2007/0289741 A1 * | 12/2007 | Rambow | 166/250.01 |
| 2008/0105648 A1 * | 5/2008 | Wang et al. | 216/13 |
| 2008/0111551 A1 * | 5/2008 | Freedman | 324/324 |
| 2008/0125974 A1 * | 5/2008 | Dubinsky et al. | 702/11 |
| 2008/0136409 A1 * | 6/2008 | Sen et al. | 324/303 |
| 2008/0151690 A1 * | 6/2008 | Tang et al. | 367/35 |
| 2008/0197851 A9 * | 8/2008 | Forgang et al. | 324/339 |
| 2008/0210420 A1 * | 9/2008 | Ramakrishnan et al. | 166/250.02 |
| 2008/0213162 A1 * | 9/2008 | Smalley et al. | 423/447.7 |
| 2008/0221800 A1 * | 9/2008 | Gladkikh et al. | 702/13 |
| 2008/0265892 A1 * | 10/2008 | Snyder et al. | 324/339 |
| 2008/0270033 A1 * | 10/2008 | Wiley et al. | 702/13 |
| 2008/0312838 A1 * | 12/2008 | Cavalca et al. | 702/11 |
| 2009/0005995 A1 * | 1/2009 | Tang et al. | 702/11 |
| 2009/0070042 A1 * | 3/2009 | Birchwood et al. | 702/12 |
| 2009/0072825 A1 * | 3/2009 | Prammer et al. | 324/303 |
| 2009/0105957 A1 * | 4/2009 | Hsu et al. | 702/12 |
| 2009/0125240 A1 * | 5/2009 | den Boer et al. | 702/11 |
| 2009/0145598 A1 * | 6/2009 | Symington et al. | 166/250.01 |
| 2009/0145600 A1 * | 6/2009 | Wu et al. | 166/250.02 |
| 2009/0157318 A1 * | 6/2009 | Woerpel et al. | 702/9 |
| 2009/0160448 A1 * | 6/2009 | Hall et al. | 324/339 |
| 2009/0173150 A1 * | 7/2009 | DiFoggio et al. | 73/152.19 |
| 2009/0242274 A1 * | 10/2009 | Chen et al. | 175/50 |
| 2009/0294753 A1 * | 12/2009 | Hauge et al. | 257/9 |
| 2010/0044034 A1 * | 2/2010 | Bailey et al. | 166/253.1 |
| 2010/0271030 A1 * | 10/2010 | Reiderman et al. | 324/338 |
| 2010/0284898 A1 * | 11/2010 | Ziegler et al. | 423/447.6 |
| 2011/0059871 A1 * | 3/2011 | Tour et al. | 507/137 |
| 2011/0095757 A1 * | 4/2011 | Nielsen et al. | 324/303 |
| 2011/0144386 A1 * | 6/2011 | Tour et al. | 562/488 |

FOREIGN PATENT DOCUMENTS

WO     2007047084 A2     4/2007

OTHER PUBLICATIONS

Byerlee, et al., "A magnetic method for determining the geometry of hydraulic fractures", Pure Appl. Geophys., Birkhauser, Verlag, Basel, 114:1976, pp. 425-433.

Constable, et al., "Mapping thin resistors (and hydrocarbons) with marine EM methods: Insights from 1D modeling", Geophysics, 71:2006, pp. G43-G51.

Constable, et al, "An intoducton to marine controlled-source electromagnetic methods for hydrocarbon exploration", Geophysics, 72:2007, pp. WA3-WA12.

Um, et al., "On the physics of the marine controlled source electromagnetic method", Geophysics, 72:2007, pp. W13-WA26.

Wilt, et al., "Oil field reservoir characterization and monitoring using electromagnetic geophysical techniques", J. Petrol. Sci. Eng., 39:2003, pp. 85-97.

Yu, et al,. "On the imaging of radio-frequency electromagnetic data for cross-borehole mineral exploration", Geophys. J. Int., 135:1998, pp. 523-541.

Tseng, et al., "A borehole-to-surface electromagnetic survey", Geophysics, 63:1998, pp. 1565-1572.

Zhadanov, et al., "Underground imaging by frequency-domain electromagnetic migration", Geophyics, 61:1996, pp. 666-682.

Maurer, et al., "Design strategies for electromagnetic geophysical surveys", Inverse Problems, 16:2000, pp. 1097-1117.

Lee, et al., "A New Appoach to Imaging wth Low-Fequency Electromagnetic Fields", Geophysics, 58:1993, pp. 780-796.

Raj, et al., "Commerci Applications of Ferrofluids", J. agnetism Mag. Mater., 85:1990, pp. 233-245.

International Search Report and Written Opinion for PCT/US09/030498 mailed Sep. 10, 2009.

Stankovich, et al., "Stable aqueous dispersions of graphitic nanoplatelets via the reduction of exfoliated graphite oxide in the presence of poly(sodium 4-styrenesulfonate)", J. Mater. Chem., vol. 16, (2005), 155-158.

Stankovich, et al., "Synthesis of graphene-based nanosheets via chemical reduction of exfoliated graphite oxide", Carbon, vol. 45, (2007), 1558-1565.

Strano, et al., "Electronic structure control of single-walled carbon nanotube functionalization", Science, vol. 301, (2003), 1519-1522.

Marcoux, et al., "Electrochemical functionalization of nanotube films: growth of aryl chains on single-walled carbon nanotubes", New J. Chem., vol. 28, (2004), 302-307.

Moore, et al., "Individually suspended single-walled carbon nanotubes in various surfactants", vol. 3, (2003), 1379-1382.

Lomeda, et al, "Diazonium functionalization of surfactant-wrapped chemically converted graphene sheets", vol. 130, No. 48, (2008), 16201-16206.

Si, et al., "Synthesis of water soluble graphene", Nano Lett., vol. 8, (2008), 1679-1682.

* cited by examiner

METHODS FOR MAGNETIC IMAGING OF GEOLOGICAL STRUCTURES

CROSS-REFERENCE TO RELATED APPLICATIONS

This application claims priority to U.S. provisional patent applications 61/019,765 filed Jan. 8, 2008 and 61/054,362 filed May 19, 2008, which are each incorporated by reference as if written herein in their entirety.

STATEMENT REGARDING FEDERALLY SPONSORED RESEARCH

Not applicable.

BACKGROUND

Most geological structures relevant to oil and gas production retain between 70% to 90% of their original hydrocarbon stores after primary production driven by natural reservoir pressure release is complete. Hydraulic fracturing is often used to increase reservoir contact and increase production rates. During the fracturing process, proppants are typically added to a fracturing fluid pumped into the geological structure in order to keep the fractures from closing in upon themselves when pressure is released. Another technique commonly used in secondary production is displacement flooding, of which water-flooding is the most common. In flooding techniques, a displacing fluid is introduced from an injection well, and oil and/or gas are extracted from a nearby production well. The displacing fluid frees oil or gas not released during primary production and pushes the oil or gas toward the production well. Displacing fluids include, for example, air, carbon dioxide, foams, surfactants, and water. Hydraulic fracturing is often applied to injection and production wells in conjunction with displacement flooding operations.

In spite of the undisputed utility of hydraulic fracturing and water-flooding in petroleum production processes, few methods exist for monitoring the extent and quality of the fracturing and flooding processes. Fractures can be monitored and approximately mapped three-dimensionally during the fracturing process by a 'micro-seismic' technique. The micro-seismic technique detects sonic signatures from rocks cracking during the fracturing process. The setup of this technique is prohibitively expensive, and data that is generated tends to be relatively inaccurate due to high background noise. Further, the process can only be performed during the fracturing process and cannot be repeated thereafter. Water-flood operations can be monitored with low resolution through four-dimensional seismic surveys. As the density difference between water and petroleum is small, the flood front is not abruptly distinguishable, and the imaging resolution tends to be on the order of tens of meters. Unlike the micro-seismic technique for monitoring fracturing, flooding operations can be measured periodically to monitor flooding progression.

Neither of the above techniques have the capability to accurately determine the size, structure and location of injected materials such as, for example, injected proppants and water-flood. Improved knowledge concerning the location of injected proppants and water-flood in fractures and natural geological pores would aid production engineers in tailoring production conditions to meet local geological settings. Further, knowledge about the location of injected proppants and fractures would significantly improve safety in production processes by identifying potentially catastrophic events before their occurrence. For example, vertical fractures can rupture the strata sealing geological structures and potentially intersect fresh water aquifers. Detecting a vertical fracture situation would allow production wells to be sealed, thereby preventing petroleum loss and aquifer damage.

In view of the foregoing, improved methods for imaging geological structures are needed. Such methods would include the capability to obtain high-resolution images of fractures and injected materials, as well as the ability for numerous measurement repetitions to be made. Utilizing such imaging methods solely or in combination with existing geological assays, production engineers could take measures to extract residual petroleum from a geological structure if it is determined that un-extracted hydrocarbons remain after production stimulated by fracturing and flooding operations or a combination thereof is complete.

SUMMARY

In various embodiments, methods for assaying a geological structure are disclosed. The methods include providing a dispersion of magnetic material in a fluid; injecting the dispersion of magnetic material into the geological structure; placing at least one magnetic probe in a proximity to the geological structure; generating a magnetic field in the geological structure with the at least one magnetic probe; and detecting a magnetic signal.

In other various embodiments of methods for assaying a geological structure, the methods include: a) providing a dispersion of magnetic material in a fluid; b) injecting the dispersion of magnetic material into the geological structure; c) placing at least one magnetic detector into the geological structure; and d) measuring a resonant frequency in the at least one magnetic detector. The resonant frequency is at least partially determined by an amount of the magnetic material injected into geological structure and a location of the magnetic material relative to the at least one magnetic detector.

In other various embodiments, methods are disclosed for using magnetic materials in electromagnetic imaging techniques utilizing transmitter-receive antenna configurations such as dipole-dipole, dipole-loop and loop-loop configurations. An illustrative method utilizing such transmitter-receiver antenna configurations includes, for example, travel-time tomography.

The foregoing has outlined rather broadly various features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein:

FIG. 1 presents finite-element modeling of the radiofrequency amplitude response of a 1 Hz dipole placed over a brine-filled rock source (FIG. 1A) and a brine-filled rock source loaded with $50\mu_o$ of magnetic material (FIG. 1B);

FIG. 2 presents finite-element modeling of the extent of y-axis magnetization in the presence of a simulated 1 mG field generated by a 1 Hz current loop, wherein the magnetic permeability is $1\mu_o$ (FIG. 2A), $5\mu_o$ (FIG. 2B), $50\mu_o$ (FIG. 2C) and $500\mu_o$ (FIG. 2D);

FIG. 5 presents finite-element modeling of simulated total magnetization in a horizontal well-bore in the presence of $50\mu_o$ injected magnetic material as determined by a resonant frequency magnetic detector with offset (FIG. 5A) and non-offset (FIG. 5B) detector configurations.

DETAILED DESCRIPTION

In the following description, certain details are set forth such as specific quantities, sizes, etc. so as to provide a thorough understanding of the various embodiments disclosed herein. However, it will be obvious to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

While most of the terms used herein will be recognizable to those of ordinary skill in the art, the following definitions are nevertheless put forth to aid in the understanding of the present disclosure. It should be understood, however, that when not explicitly defined, terms should be interpreted as adopting a meaning presently accepted by those of skill in the art.

"COMSOL®," refers to a finite-element modeling (FEM) software package available for various physics and engineering applications (http://www.comsol.com). COMSOL® modeling presented herein includes static and time-varying three-dimensional electromagnetic modeling.

"Ferrite" as defined herein, refers to a ferromagnetic compound formed from iron (III) oxide and another oxide. Illustrative ferrites include materials with a general formula $AM_2O_4$, wherein A and M are metal atoms and at least one of A and M is Fe.

"Ferrofluid," as defined herein, refers to a liquid that becomes polarized in the presence of a magnetic field. A ferrofluid typically includes a paramagnetic, superparamagnetic, ferromagnetic or ferrimagnetic material disposed as a colloidal suspension in a carrier fluid such as, for example, an organic solvent or water. The magnetic material disposed in the carrier fluid can be a magnetic nanoparticle.

"Hematite," as defined herein, refers to a common mineral form of iron (III) oxide.

"Magnetite," as defined herein, refers to a ferrimagnetic mineral having a chemical formula $Fe_3O_4$.

"RLC circuit," as defined herein, refers to an electrical circuit including a resistor (R), an inductor (L), and a capacitor (C), connected in series or in parallel.

Most economically interesting geological structures such as, for example, petroleum reservoirs, have low magnetic permeabilities, essentially equal to that of vacuum, $\mu_o$. In various embodiments, the present disclosure describes injecting magnetic materials into geological structures and then detecting the magnetic materials within the geological structures. Detecting the magnetic materials provides a means for imaging the locations of fractures and injected materials within the geological structures. Since the magnetic permeabilities of geological structures are typically very low, any injected magnetic materials will substantially modify detected magnetic flux response compared to that typically seen for native rocks, natural gas, oil, water, and brine of most geological structures. Such magnetic imaging techniques are advantageous over methods currently in use for monitoring petroleum production by allowing high-resolution and repeatable imaging during production processes.

In various embodiments, methods for assaying a geological structure are disclosed. The methods include providing a dispersion of magnetic material in a fluid; injecting the dispersion of magnetic material into the geological structure; placing at least one magnetic probe in a proximity to the geological structure; generating a magnetic field in the geological structure with the at least one magnetic probe; and detecting a magnetic signal. In some embodiments, the geological structure is penetrated by at least one vertical well. In some embodiments, the geological structure is penetrated by at least one horizontal well. One skilled in the art will recognize that the terms vertical well and horizontal well should not be considered limiting, and various well-bore angles between these two extremes are common in the art and may be utilized within the spirit and scope of this disclosure. In various embodiments, the geological structure includes a deposit such as, for example, oil, gas, or combinations thereof.

Geological structures have been characterized over geologically-relevant dimensions using electromagnetic methods, but these methods have not heretofore utilized injected magnetic materials. Electromagnetic methods for characterizing geological structures have typically relied upon the low conductivity and permittivity of petroleum compared to brine, which is usually found concurrently with petroleum in geological structures. An illustrative electromagnetic method for characterizing geological structures is controlled-source electromagnetic (CSEM) surveying. In this method, variations in geological structure conductivity are detected via the electrical component of an applied electromagnetic field. Spatial variation in conductivity results in changes in received signal amplitude, thus indicating a possible petroleum-containing geological structure. CSEM surveying has typically been used for mapping non-conductive deposits in deep marine environments using electric dipole transmitter and receiver antennas. The thick layer of highly conductive seawater screens the electric dipole receiver antennas from airpath interference.

Figure 1A:
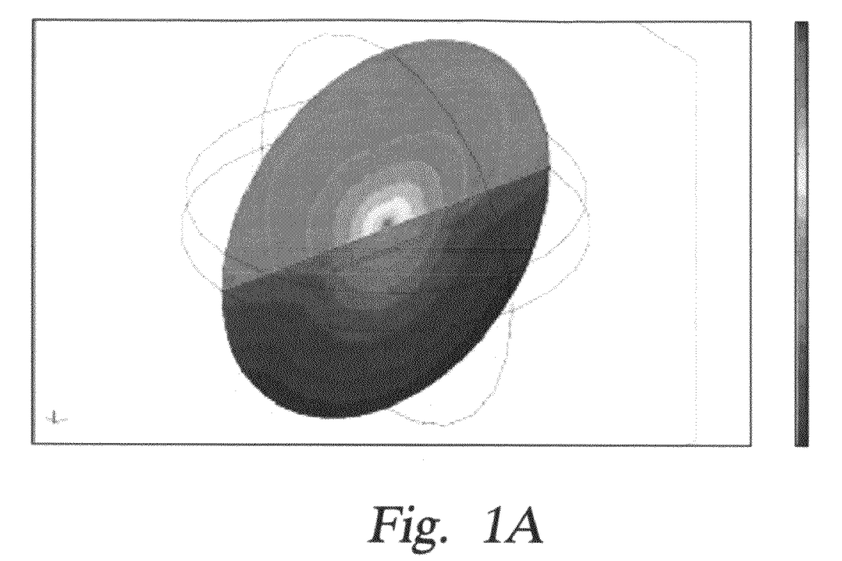
Figure 1B:
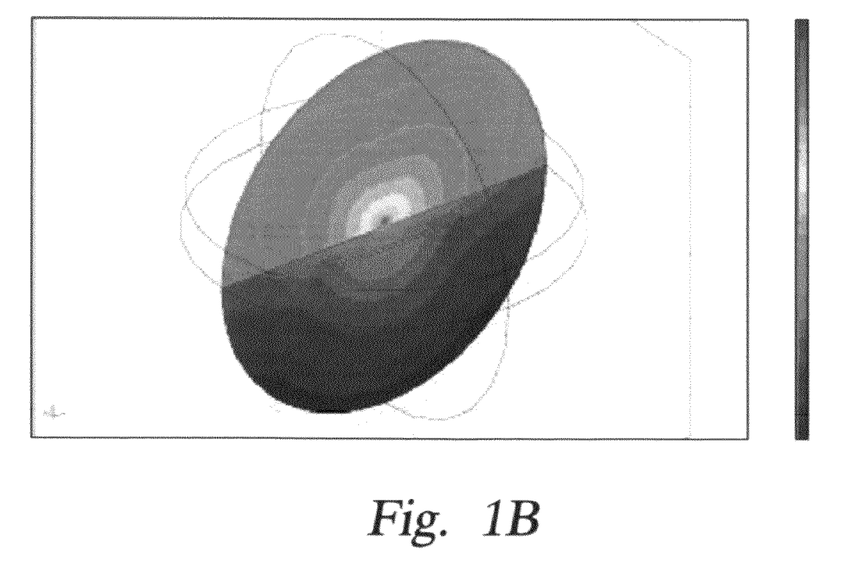
Figure 2A:
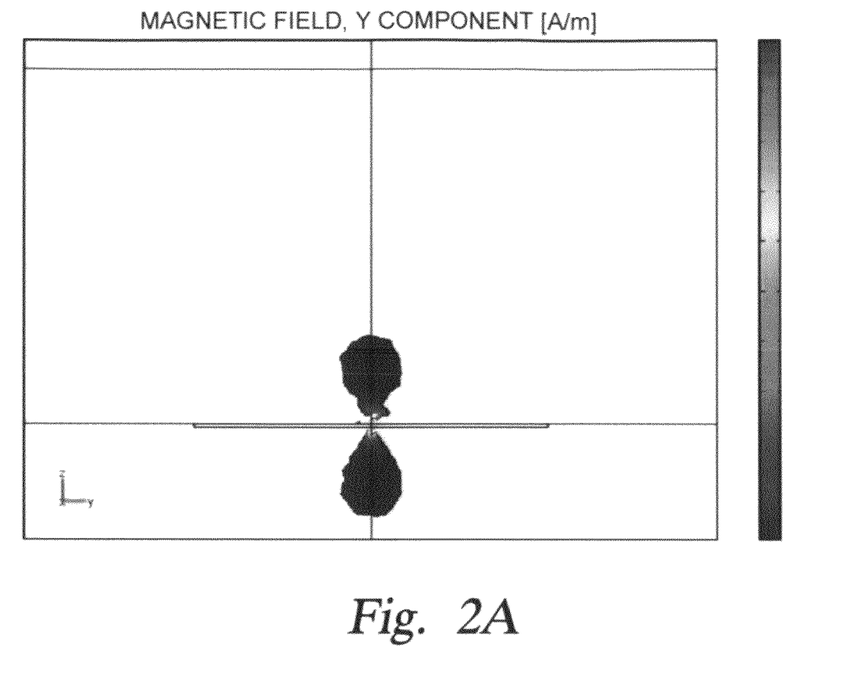
Figure 2B:
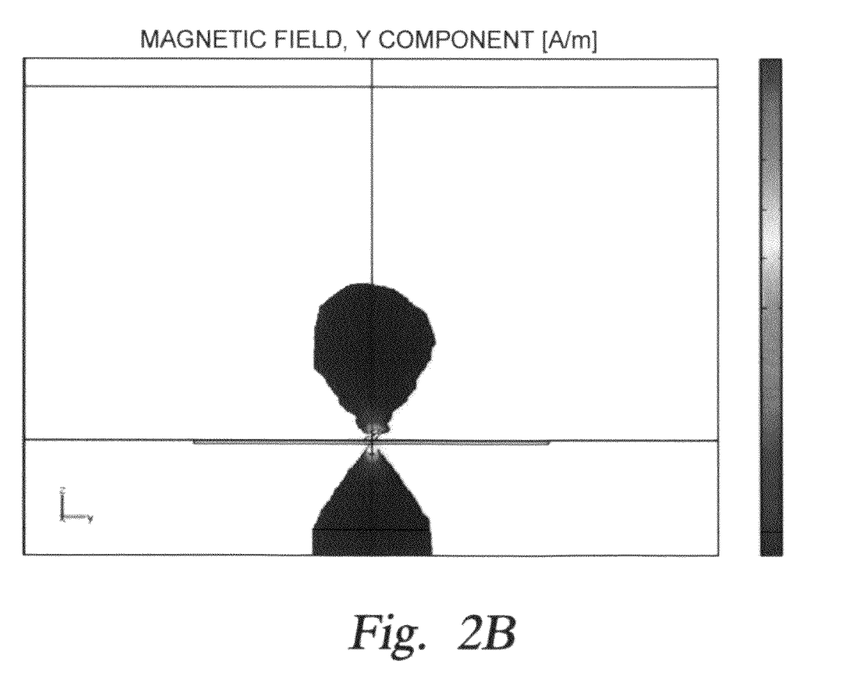
Figure 2C:
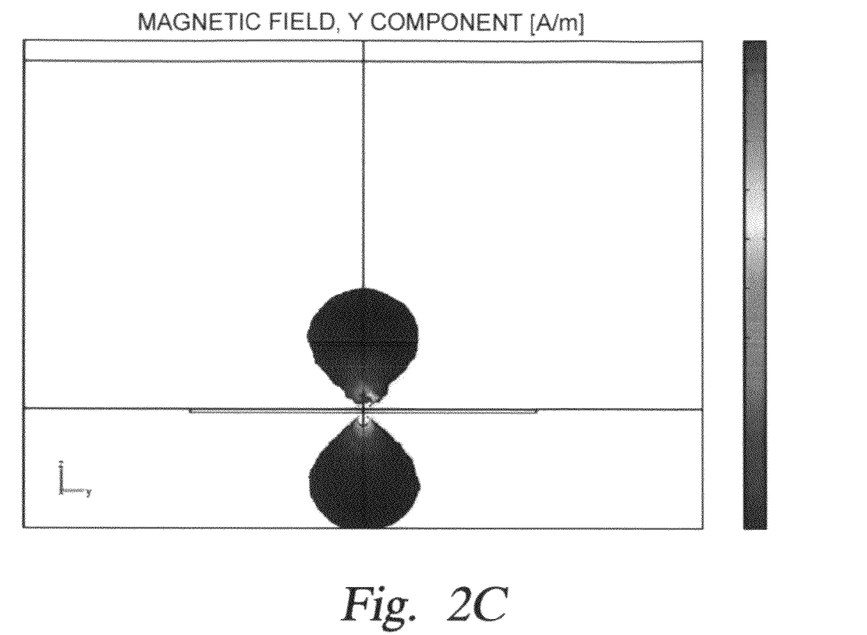
Figure 2D:
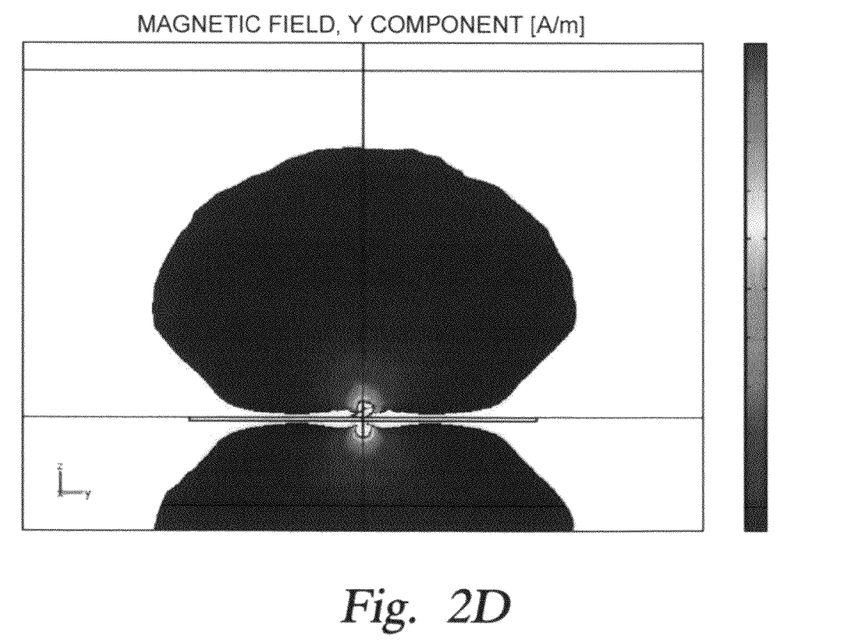

The effects of injected magnetic material may be simulated using finite-element modeling, such as that performed using COMSOL® software. Illustrative finite-element modeling depicting the influence of injected magnetic materials on radiofrequency amplitude response in the presence of a 1 Hz dipole in proximity to a simulated geological structure are shown in FIGS. 1A and 1B. FIG. 1A presents finite-element modeling of radiofrequency amplitude response of a 1 Hz dipole over a brine-filled rock source. FIG. 1B presents finite-element modeling of radiofrequency amplitude response of a 1 Hz dipole over the same brine-filled rock source loaded with $50\mu_o$ of magnetic material. In the illustrative models presented in FIGS. 1A and 1B, the target measurement zone is located on-shore with dimensions of 4 kilometers long by 200 meters wide and positioned 1000 meters below a rock/air interface within a sphere having a radius of 5 kilometers. The target measurement zone is modeled as rock filled with brine having a conductivity σ=1.5 S (FIG. 1A) and brine loaded with magnetic material at $\mu=50\mu_o$ (FIG. 1B). As is evident from comparing the magnetic flux lines in FIGS. 1A and 1B, magnetic material in the target measurement zone significantly spreads radiofrequency amplitude response at the air/rock interface.

The amount of injected magnetic material significantly influences the spread of magnetic flux lines as illustrated by the models shown in FIG. 2. FIGS. 2A, 2B, 2C and 2D illustrate finite-element modeling depicting the extent of y-axis magnetization in the presence of a simulated 1 mG field strength generated by a 1 Hz current loop. The plane of the current loop is oriented vertically. The current loop is 2 meters in diameter and embedded in a target plane of 30% porosity rock filled with brine. The target plane is 1000 meters below the surface of a geological formation, above which is air. The target plane magnetic permeability is varied through 1, 5, 50 and 500$\mu_o$ to illustrate the change in observed y-axis magnetization. As is evident from FIGS. 2A, 2B, 2C and 2D, the extent of y-axis magnetization is highly influenced by the amount of magnetic material present. Similar changes in magnetization can be visualized along other axes.

A number of different magnetic materials may be used in the methods described herein. Magnetic materials of the present disclosure typically are characterized by high magnetic permeabilities at low applied magnetic fields. Low applied magnetic fields typically include, for example, magnetic field strengths less than about 0.1 Tesla. One skilled in the art will recognize, however, that higher magnetic fields may be applied in the methods described herein. Magnetic materials include, for example, paramagnetic, superparamagnetic, ferromagnetic and ferrimagnetic materials. In various embodiments, the magnetic materials are dispersed in a fluid such as, for example, water, brine, drilling mud, fracturing fluid and combinations thereof. In some embodiments, the fluid includes a proppant such as, for example, sand. Injection of magnetic materials can be conducted during fracturing or flooding operations. Magnetic materials can be added to injected proppants and used during fracturing to monitor the extent of the fracturing process. Likewise, magnetic materials can also be used during flooding operations to monitor flood front progression through the geological structure.

In various embodiments of the methods, the dispersion of magnetic material comprises a ferrofluid. The ferrofluid may include a dispersion of magnetic nanoparticles, which forms the ferrofluid. Ferrofluids may be injected directly into the geological structures or diluted in another fluid for injection in the geological structures. In various embodiments of the methods, the magnetic material comprises magnetic nanoparticles. In various embodiments of the methods, the magnetic material includes, for example, iron, cobalt, iron (III) oxide, magnetite, hematite, ferrites, and combinations thereof. As defined hereinabove, an illustrative ferrite has a general chemical formula $AM_2O_4$, where A and M are metal atoms and at least one of A and M is Fe. In various embodiments, the ferrites are doped with at least one element that is not A or M. Ferrofluids generally include magnetic metal or metal oxide particles such as, for example, iron, cobalt, iron (III) oxide, and magnetite. Several ferrofluids are commercially available or are easily synthesized. Most commercially-available ferrofluids are based on magnetite, which provides a low-field permeability of about 100$\mu_o$. Higher permeabilities are advantageous for increased detection sensitivities in the embodiments described herein. An illustrative high-permeability ferrofluid is formed from a manganese- and zinc-doped ferrite, which provides a low-field permeability of about 25,000$\mu_o$. Doping a barrel of brine to about 50$\mu_o$ would require about 160 grams of this doped ferrite. Based on current prices of iron, manganese and zinc, brine doping could be accomplished for at most a few dollars per barrel, making the methods described herein economically viable for geological structure assays. Iron nanoparticle suspensions and simple slurries of iron powders having grain sizes similar to those of sand are also commercially available and are suitable for use in the methods described herein.

In various embodiments, the magnetic materials are modified prior to their injection into the geological structures. Modifications are used, for example, to prevent particle aggregation in the injection fluid, to reduce adhesion to the geological structures, and to maximize transport through the geological structures. In various embodiments, the magnetic materials are covered with a coating such as, for example, surfactants, polymers and combinations thereof. Surfactants are selected from neutral, anionic, or cationic surfactants.

The sizes of the injected magnetic materials are chosen to be most compatible with the selected magnetic imaging application. Typical proppants used in hydraulic fracturing operations nominally resemble sand grains having diameters between about 300 µm to about 1 mm. Hydraulic fractures, in comparison, can be about one centimeter wide or greater. Naturally-occurring pores in geological structures encompass a wide range of dimensions depending on local rock types and degrees of cementation. Pores in typical sandstones are in the range of about 10 µm to about 50 µm. Carbonates typically have a wide pore size distribution ranging between about 100 nm and about 10 mm. The bulk of the pore volume in common petroleum-producing rocks includes pores typically greater than about 100 nm in diameter. Therefore, magnetic materials used in the methods described herein may be varied through a wide range of sizes to be compatible with natural pore sizes and fractures. In various embodiments of the methods disclosed herein, the magnetic materials have diameters between about 10 nm and about 1 µm. In various embodiments of the methods disclosed herein, the magnetic materials have diameters between about 10 nm and about 100 nm. In various embodiments of the methods disclosed herein, the magnetic materials have diameters between about 10 nm and about 50 nm. As will be evident to one skilled in the art, particle size of the magnetic material is chosen while bearing factors other than geological structure pore size and fracture size in mind. For example, magnetic material particle size can influence the particle's observed magnetic properties, hydrodynamic radius, aggregation tendency, and extractability.

Magnetic fields may be generated within geological structures through various means by using a magnetic probe. For example, the magnetic fields can be supplied by permanent magnets, electromagnets, solenoids, antennas and combinations thereof. The magnetic probe produces a magnetic field that may be a DC field, an AC field, a pulsed field, or a field that varies in both time and amplitude. The magnetic probe field may be modulated in a manner to enable frequency-domain, time-domain or phase-shift detection methods to maximize signal-to-noise ratio, and to maximize rejection of natural background noise and 1/f noise.

Magnetic fields are projected in the geological structures in a number of ways by using a magnetic probe. An illustrative means for generating a magnetic field in the geological structures involves well-bores penetrating the geological structures. In various embodiments, the geological structures are penetrated by at least one well comprising a ferromagnetic material, and the ferromagnetic material is used to channel a magnetic field into the geological structures. Steels commonly used in drill stems and well-bore casings are typically strongly ferromagnetic with a low-field permeability up to about 5,000$\mu_o$. Connecting a magnetic probe magnetization source such as, for example, a permanent magnet or solenoid at the surface end of such well-bore casings allows a magnetic field component, B, to be transmitted along the well-bore casing into the geological structures. The well-bore casing therefore provides a magnetic flux distal to the magnetization source. When utilized in this manner, the well-bore casings function analogously to an antenna for transmitting a magnetic probe signal into the geological structures.

Figure 3:
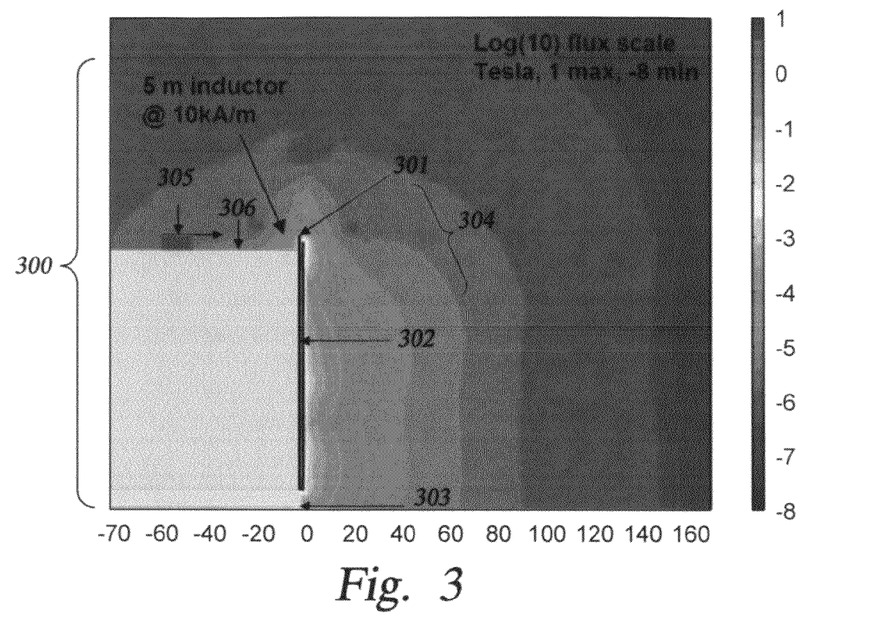
FIG. 3 presents a 1:30 scale schematic model of the simulated magnetic flux generated in a geological structure through a magnetic well-bore in the absence of injected magnetic material.

FIG. 3 presents a 1:30 scale schematic model of the simulated magnetic flux generated in a pristine geological structure 300 (no native or injected magnetic material) using a magnetic well-bore 302. The logarithm of the magnetic field intensity is indicated by color contour in the figure. A magnetic probe magnetization source (not shown) is applied to surface end 301 of well-bore 302. The model includes empty injection zone 303 to be used for introducing magnetic material. For this illustrative model, well-bore 302 was chosen to be 100 meters in depth, and injection zone 303 was chosen to be 5 meters in thickness. Magnetic flux lines 304 are measured using movable detector 305, which is transported along surface 306 of pristine geological structure 300. Magnetic flux lines 304 are illustrative of those obtained in the absence of injected magnetic material.

Figure 4:
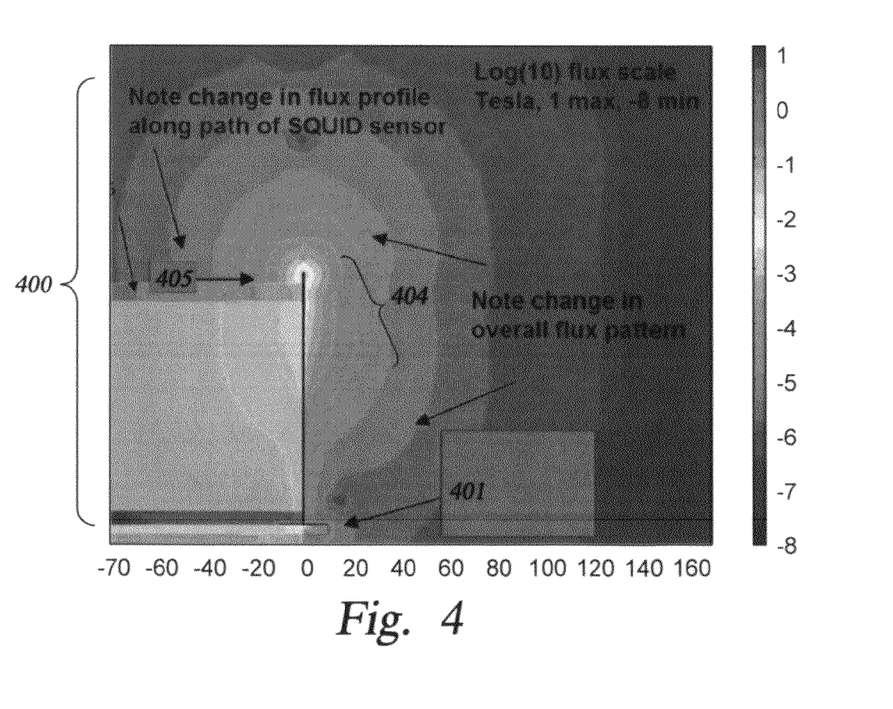
FIG. 4 presents a 1:30 scale schematic model of the simulated magnetic flux generated in a geological structure through a magnetic well-bore in the presence of $50\mu_o$ injected magnetic material.

FIG. 4 presents the same 1:30 scale schematic model of the simulated magnetic flux generated in infiltrated geological structure 400 after injecting sufficient magnetic material into flooded injection zone 401 to produce a permeability of about $50\mu_o$. As in FIG. 3, magnetic flux lines 404 are measured using movable detector 405, which is transported along surface 406 of infiltrated geological structure 400. Comparison of the magnetic flux lines 404 in FIG. 4 to the magnetic flux lines 304 in FIG. 3 demonstrates that substantial changes in simulated magnetic flux can be realized by injecting magnetic materials into the geological structures. The models presented in FIGS. 3 and 4 are equally valid for use in operations involving magnetic material-doped water-flood or magnetic material-loaded proppant.

The methods illustrated by the models presented in FIGS. 3 and 4 are advantageous in being applicable to both fracturing and water-flood stages of the petroleum production process. Further, the methods are readily repeatable to monitor production in near real-time, factoring into account integration time length for data acquisition and processing. In various embodiments, the detected magnetic signal is correlated with an internal structure of the geological structure. For example, changes in the magnetic flux lines are indicative of internal structure alterations of the geological structure. Monitoring of changes to the internal structures of the geological structure allows production monitoring. In various embodiments, the methods include detecting a magnetic signal in the geological structure before injecting the dispersion of magnetic material. Measuring a magnetic signal in the geological structure before production begins provides a baseline for evaluating internal structure changes resulting from fracturing or water-flood operations. For example, comparison via subtraction can be utilized to analyze the geological structure before and after production begins. In typical practice of the methods described herein, production engineers will compare field magnetization data with mathematical models such as, for example, those presented hereinabove and related inversion techniques to infer the size, shape, and extent of magnetic material incursion in the geological structure.

A magnetic signal may be induced at the surface or below the surface of the geological structure. In various embodiments, the proximity of the at least one magnetic probe is above the geological structure. For example, as discussed hereinabove, a magnetic field can be projected into the geological structure through a magnetic well-bore. In other various embodiments, the proximity of the at least one magnetic probe is within the geological structure. For example, a magnetic field can be generated within the geological structure with a solenoid located within the geological structure. Magnetic fields generated within the geological structure are particularly useful for practicing the methods described herein when there is no magnetic well-bore penetrating the geological structure.

Detection of magnetic flux lines may be conducted at one or more detection points away from the magnetic probe providing the applied magnetic field. Detection may occur on the surface of the geological structure or within the geological structure. Detection may be accomplished with a single detector or an array of detectors. Detectors may be stationary or movable to record magnetic flux data at more than one point. In various embodiments, the detecting step is conducted with at least one detector that is movable. In various embodiments, the detecting step includes detecting a magnetic signal, moving the at least one detector, and repeating the detecting step to collect magnetic flux data at more than one point. Detector arrays are used to record magnetic signals at a number of points simultaneously. A single detector may be, for example, a SQUID detector or a conventional solenoid, each of which may be fixed or movable over the surface of the geological structure. In various embodiments, the detecting step is conducted with at least one SQUID detector. SQUID detectors are advantageous for maximizing sensitivity in the methods described herein. In other various embodiments, the detecting step is conducted with at least one solenoid. For detector arrays, low cost conventional solenoids or other known magnetic sensors are more advantageous. In still other various embodiments, the detecting step includes measuring a resonant frequency in the at least one magnetic probe. Measurement of a resonant frequency in the at least one magnetic probe provides a particularly sensitive means of magnetic permeability detection and is considered in more detail hereinbelow.

Not all drilling applications involve a vertical well-bore as depicted in FIGS. 3 and 4. For example, horizontal drilling techniques provide 'lateral' well-bores. Such lateral well-bores are typically used to maximize contact with a geological structure. Lateral well-bores may be optionally fractured prior to or during production or used in conjunction with water-flood.

The orientation of lateral well-bores may not allow sufficient channeling of an external magnetic field into the geological structure, even when the lateral well-bore includes a ferromagnetic well casing. In such instances and others, at least one magnetic detector may be placed into the well-bore to measure the magnetic flux lines. At least one magnetic detector may also be placed in a vertical well-bore when an external magnetic field is not sufficiently channeled into the geological structure from above using a magnetic probe. In other various embodiments of methods for assaying a geological structure, the methods include: a) providing a dispersion of magnetic material in a fluid; b) injecting the dispersion of magnetic material into the geological structure; c) placing at least one magnetic detector into the geological structure; and d) measuring a resonant frequency in the at least one magnetic detector. The resonant frequency is at least partially determined by an amount of the magnetic material injected into geological structure and a location of the magnetic material relative to the at least one magnetic detector. In various embodiments, the at least one magnetic detector is connected to an RLC circuit. In various embodiments, the methods include measuring a resonant frequency, moving the at least one magnetic detector, and repeating the measuring step. A resonant frequency magnetic detector may include, for example, a solenoid or a directional-loop antenna placed within a well-bore. When connected to an active RLC circuit, a resonant frequency of a solenoid is determined by the capacitance and inductance of the C and L circuits, respectively. Positioning of the solenoid coil within the geological structure provides an inductance that is at least partially determined by the amount of magnetic material that is injected into the geological structure and the location of the magnetic material relative to the solenoid coil.

Figure 5A:
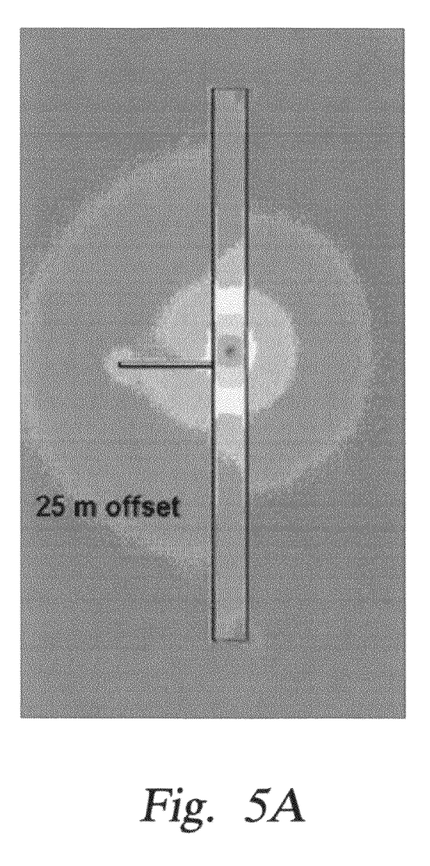
Figure 5B:
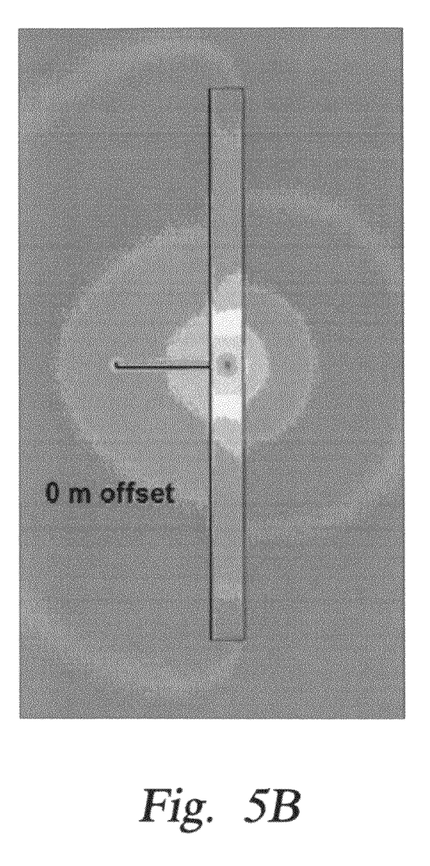

FIG. 5 presents finite-element modeling of the simulated total magnetization in a lateral well-bore as determined by a resonant frequency magnetic detector with an offset (FIG. 5A) and non-offset (FIG. 5B) detector configuration relative to a high-flow rate path or natural fracture channel (herein referred to as a 'runner') away from the main well-bore. Effects of runners in petroleum production include, for example, early water breakthrough, which impedes efficient petroleum production. Therefore, timely detection of runners is clearly desirable. In the finite-element models presented in FIGS. 5A and 5B, the geological structure is injected with $50\mu_o$ of magnetic material, and the magnetization is determined at a detector offset of 25 meters from the runner in FIG. 5A and zero meters from the runner in FIG. 5B. The magnetic flux line changes produced with centered and offset detector configurations are illustrative of the changes observable in physical geological structures penetrated with magnetic materials during fracturing or water-flood operations. Filling of the runner with magnetic material changes the total magnetization, thereby changing L by about one part in $10^4$, as the magnetic probe position is moved away from the runner. Such frequency changes are typically measurable to within about one part in $10^9$ or greater using electronic detectors such as, for example, frequency counters. Thus, in geological structures injected with magnetic materials, the location of a flood front, including progression into runners and filled fractures, may be detected using a moveable resonant frequency magnetic detector. In dual well-bore systems, the movable resonant frequency magnetic detector may be placed in the injection well-bore, production well-bore, or both well-bores. Likewise, the movable resonant frequency magnetic detector may be located on the surface of the geological structure.

Dipole-dipole, dipole-loop and loop-loop configurations for cross-well and borehole-to-surface electromagnetic imaging techniques have been under development for some time for detecting and imaging conductive subsurface features. Generally, frequency (phase) domain detection and inversion have been employed in such systems, despite their high computational intensity. Forward-propagation and inversion algorithms for cross-well electromagnetic propagation in diffusive media have also been under development. A relatively new time-domain approach called travel-time tomography potentially provides simpler electronics and reduced computational burden relative to other techniques in this field. Magnetic imaging techniques have not yet been applied in these more advanced geological imaging surveys. In various embodiments, methods are disclosed for using magnetic materials in electromagnetic imaging techniques utilizing transmitter-receiver antenna configurations such as, for example, dipole-dipole, dipole-loop, and loop-loop configurations. More sensitive detectors including, for example, flux-gates and SQUID detectors may also be coupled to the electromagnetic imaging techniques.

The methods disclosed herein for using magnetic materials in dipole-dipole, dipole-loop and loop-loop configurations include development of approaches for inverting time and amplitude signals in the presence of magnetic materials and an estimation of computational intensity needed for each. An additional frequency domain detection technique relevant to these approaches is referred to as higher-order spectral analysis. The higher-order spectral analysis techniques include the use of the coherence of multiple frequency components to detect weaker signals in the presence of Gaussian and non-Gaussian noise. A multi-frequency coherent source or a scattering mechanism that is either nonlinear or parametric-linear is used in application of the techniques. Application of magnetic materials in these techniques is advantageous in providing signal detection (with sufficient averaging) in the presence higher noise levels than is possible with more traditional frequency domain detection techniques. Further, application of magnetic materials in the techniques allows sensor arrays to be used to determine time of arrival for inversion processing at lower signal to noise ratios.

A consideration concerning the use of magnetic materials in imaging geological structures is a modulation of electromagnetic signal transport. In a magnetically-loaded fluid, electromagnetic signal speed decreases in accordance with the formula (1), where c is the speed $$v = c/(\in\mu)^{1/2} \qquad (1)$$

of light, $\in$ is the relative dielectric constant, and $\mu$ is the relative magnetic permeability. Velocity changes in electromagnetic signals have been used extensively in the art of well logging, where the dielectric constant difference between petroleum and water shifts observed signal velocity from 5 ns/m to 29 ns/m. Electromagnetic signal velocity in an aqueous ferrofluid at $50\mu_o$ to is calculated to be about 200 ns/m. Therefore, a significant electromagnetic signal velocity shift is possible for magnetically-loaded water-floods when applied to travel-time tomography imaging. Higher-order harmonics generated upon saturation of the magnetic materials would facilitate frequency domain discrimination such as, for example, through higher-order spectral analysis.

Any of the methods described hereinabove are potentially applicable for tracking pollutants within a geological structure. For example, leakage from a chemical storage facility could potentially be monitored by adding a magnetic material at the chemical storage facility source and then analyzing for the presence of magnetic material in a nearby geological structure. An abrupt or gradual change in magnetic signal would indicate a leaking condition. Likewise, the methods could potentially be used to monitor pollutant migration through a geological structure such as, for example, from agricultural runoff. Similarly, the methods described herein could potentially be used to monitor the transport and chemical conversion of zero-valent iron particles that are used in ground water contamination remediation.

From the foregoing description, one skilled in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure, which is defined in the following claims.

What is claimed is:

1. A method for imaging the infiltration of a magnetic material into a geological structure, wherein the method comprises:
    a) providing a dispersion of magnetic material in a fluid, wherein the magnetic material comprises magnetic nanoparticles;

b) injecting the dispersion of magnetic material into the geological structure;
c) placing at least one magnetic probe in a proximity to the geological structure;
d) generating a magnetic field in the geological structure with the at least one magnetic probe; and
e) detecting a magnetic signal.

2. The method of claim 1, wherein the geological structure comprises a deposit selected from the group consisting of oil, gas, and combinations thereof.

3. The method of claim 1, wherein the geological structure is penetrated by at least one vertical well.

4. The method of claim 1, wherein the geological structure is penetrated by at least one horizontal well.

5. The method of claim 1, wherein the geological structure is penetrated by at least one well comprising a ferromagnetic material; and wherein the ferromagnetic material is used to channel the magnetic field into the geological structure.

6. The method of claim 1, wherein the dispersion of magnetic material comprises a ferrofluid.

7. The method of claim 1, wherein the magnetic material is selected from the group consisting of iron, cobalt, iron (III) oxide, magnetite, hematite, ferrites, and combinations thereof.

8. The method of claim 7, wherein the ferrites comprise a material having a formula $AM_2O_4$; wherein A and M are metal atoms; and wherein at least one of A and M are Fe.

9. The method of claim 8, wherein the ferrites are doped with at least one element that is not A or M.

10. The method of claim 1, wherein the magnetic material has a diameter of about 10 nm to about 50 nm.

11. The method of claim 1, wherein the magnetic material is covered with a coating selected from the group consisting of surfactants, polymers, and combinations thereof.

12. The method of claim 1, wherein the fluid is selected from the group consisting of water, brine, drilling mud, fracturing fluid, and combinations thereof.

13. The method of claim 12, wherein the fluid further comprises a proppant.

14. The method of claim 1, wherein the detecting step is conducted with at least one SQUID detector.

15. The method of claim 1, wherein the detecting step is conducted with at least one solenoid.

16. The method of claim 1, wherein the detecting step is conducted with at least one detector that is movable.

17. The method of claim 1, wherein the detecting step comprises measuring a resonant frequency in the at least one magnetic probe.

18. The method of claim 1, wherein the proximity of the at least one magnetic probe is above the geological structure.

19. The method of claim 1, wherein the proximity of the at least one magnetic probe is within the geological structure.

20. The method of claim 16, further comprising: moving the at least one detector; and repeating the detecting step.

21. The method of claim 1, wherein the magnetic signal is correlated with an internal structure of the geological structure.

22. The method of claim 1, further comprising detecting a magnetic signal in the geological structure before injecting the dispersion of magnetic material.

23. A method for imaging the infiltration of a magnetic material into a geological structure, wherein the method comprises:
a) providing a dispersion of magnetic material in a fluid, wherein the magnetic material comprises magnetic nanoparticles;
b) injecting the dispersion of magnetic material into the geological structure;
c) placing at least one magnetic detector into the geological structure; and
d) measuring a resonant frequency in the at least one magnetic detector;
wherein the resonant frequency is at least partially determined by an amount of the magnetic material injected in the geological structure and a location of the magnetic material relative to the at least one detector.

24. The method of claim 23, wherein the at least one magnetic detector is connected to an RLC circuit.

25. The method of claim 23, further comprising: moving the at least one magnetic detector; and repeating the measuring step.

* * * * *